United States Patent
Pelliccione et al.

(10) Patent No.: US 11,841,243 B1
(45) Date of Patent: Dec. 12, 2023

(54) FREQUENCY MULTIPLEXED OPERATION OF VIBRATORY GYROSCOPES FOR CONTINUOUS SELF-CALIBRATION

(71) Applicant: HRL Laboratories, LLC, Malibu, CA (US)

(72) Inventors: Matthew Pelliccione, Santa Monica, CA (US); Logan Sorenson, Thousand Oaks, CA (US); David Chang, Calabasas, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 17/668,145

(22) Filed: Feb. 9, 2022

(51) Int. Cl.
*G01C 25/00* (2006.01)
*G01C 19/5726* (2012.01)

(52) U.S. Cl.
CPC ......... *G01C 25/00* (2013.01); *G01C 19/5726* (2013.01)

(58) Field of Classification Search
CPC ............................ G01C 19/5726; G01C 25/00
See application file for complete search history.

(56) References Cited

U.S. PATENT DOCUMENTS

| | | | |
|---|---|---|---|
| 7,103,477 B1 | 9/2006 | Lee | |
| 7,886,598 B2 | 2/2011 | Wyse et al. | |
| 7,912,664 B2 | 3/2011 | Rozelle | |
| 8,011,246 B2 | 9/2011 | Stewart | |
| 8,146,401 B2 | 4/2012 | Frey | |
| 10,191,079 B2 | 1/2019 | Shirazi et al. | |
| 10,451,438 B2 | 10/2019 | Roberts-Thomson et al. | |
| 2013/0125614 A1* | 5/2013 | Casinovi | G01C 19/5776 73/1.77 |

OTHER PUBLICATIONS

"Coriolis Vibratory Gyros" D.D. Lynch, Symposium Gyro Technology 1998 Stuttgart, Germany.

* cited by examiner

*Primary Examiner* — Walter L Lindsay, Jr.
*Assistant Examiner* — Andrew V Do
(74) *Attorney, Agent, or Firm* — Ladas & Parry, LLP

(57) ABSTRACT

A Coriolis vibratory gyroscope having a resonator with at least a first and a second n=2 vibratory modes of same resonance frequency in a resonator plane; first and second sensing circuits for generating first and second sense signals in response to a motion of the resonator along a major axis of the first and second vibratory modes; a first drive circuit for driving the resonator in the first vibratory mode with a first drive signal; a second drive circuit for simultaneously driving the resonator in the second vibratory mode with a second drive signal; wherein said first signal has a first frequency equal to a resonant frequency of said resonator in said first vibratory mode, and said second signal has the same frequency as the first signal, modulated in amplitude with a second frequency.

17 Claims, 5 Drawing Sheets

```
                    ┌─────────────────────────────────────────────┐
                    │ Driving first vibratory mode of resonator at first frequency │
                    │ equal to a resonant frequency of resonator                   │
                    │                                                    52        │
                    └─────────────────────────────────────────────┘
```

Driving first vibratory mode of resonator at first frequency equal to a resonant frequency of resonator  
52

Driving second vibratory mode of resonator at first frequency, modulated in amplitude with a second frequency.  
54

Generating a first measurement signal of a rate of a rotation applied to the resonator in the resonator plane plus a measurement bias  
56

Demodulating a second sense signal based on resonator oscillation in second vibratory mode in phase at said first frequency  
60

Generating a second measurement signal of said measurement bias minus said rate of a rotation applied to the resonator in the resonator plane.  
58

Demodulating a first sense signal based on resonator oscillation in first vibratory mode in phase at said first frequency  
62

Demodulating demodulated signal in phase at second frequency.  
64

FIG. 8

FREQUENCY MULTIPLEXED OPERATION OF VIBRATORY GYROSCOPES FOR CONTINUOUS SELF-CALIBRATION

CROSS REFERENCE TO RELATED APPLICATIONS

NA

STATEMENT REGARDING FEDERAL FUNDING

NA

TECHNICAL FIELD

This disclosure relates to Coriolis vibratory gyroscopes and methods of operating thereof.

BACKGROUND

Coriolis Vibratory Gyros (CVGs) preferably use resonators with axisymmetric bodies (vibrating string, cylinder, hemisphere) but they can also use resonators with asymmetric bodies (tuning forks, etc.). In a CVG, one of the resonant modes of an elastic body or resonator is excited to a prescribed amplitude. When the device rotates about a particular body-fixed axis, the resulting Coriolis forces acting on the body's vibrating mass elements excite a different resonant mode. The rate at which energy is transferred to this second mode is a measure of the rotation rate about the sensitive axis. Preferably, the natural frequency or the second mode is at or near that of the first. CVGs are particularly suitable for being manufactures as MEMs and are thus desirable in a number of apparatuses, such as environmentally robust, high-performance inertial sensors with attractive CSWaP (Cost Size Weight and Power), for example in weapon systems or vehicle navigational and/or location systems. However, CVGs generally present a measurement bias or zero offset that must be dealt with.

A common prior art for self-calibration relies on using multiple sensors, either in a non-orthogonal cluster configuration or a duplicate of the sensor to be calibrated that is oriented along the same principal sensing axis (see for example U.S. Pat. No. 8,146,401B2, U.S. Pat. No. 7,103,477B1 and U.S. Pat. No. 7,912,664B2). Another method of self-calibration relies on exposing the sensor to a predetermined input to perform the calibration (see for example U.S. Ser. No. 10/451,438B2). Additional prior art is relevant for calibrating scale factor (the constant that relates a voltage reading to an input rate, as in U.S. Ser. No. 10/191,079B2), however these methods do not measure bias which is ultimately the driver of device performance. Related prior art relies on mode reversal or mode switching (see for example U.S. Pat. No. 7,886,598B2 and U.S. Pat. No. 8,011,246B2), which is effectively a form of time domain multiplexing where the device is run a certain way for a first period of time, then switched to a different mode configuration for a second period of time. A disadvantage of this prior art is that it is not continuous and calibration updates are discrete when the modes are switched, thus making it ill suited for time-varying bias. Other prior art rely on partial axis reversal which builds on mode reversal.

The need for continuous, fast self-calibration has up to this point been addressed by trying to use look-up tables for bias compensation, or introducing physical input axis switching which can disrupt device performance and only calibrates at discrete instances in time. These methods are insufficient outside of specific operating conditions that are not shared amongst every application.

What is needed is a CVG (and related method of operation) that allows measuring bias continuously, that does not require redundant sensors to operate, and that does not require a predetermined calibration input.

The embodiments of the present disclosure answer these and other needs.

SUMMARY

A first embodiment of this presentation comprises, a vibratory gyroscope with a resonant structure that exhibits a degeneracy in its modal structure, where a first mode is maintained at resonance frequency and simultaneously a second mode is maintained at the resonance frequency modulated in amplitude at a dither frequency. A first mode output is demodulated at the resonance frequency to output a signal proportional to a sum of a rotation rate of the gyroscope and the measurement bias of the gyroscope. A second mode output is demodulated first at the resonance frequency and then at the dither frequency to output a signal proportional to a difference of the measurement bias of the gyroscope and the rotation rate of the gyroscope. These demodulated outputs are used to calculate the rotation rate and the bias.

Another embodiment disclosed herein comprises a Coriolis vibratory gyroscope having: a resonator with at least a first and a second $n=2$ vibratory modes of same resonance frequency in a resonator plane; first and second sensing circuits for generating first and second sense signals in response to a motion of the resonator along a major axis of the first and second vibratory modes; a first drive circuit for driving the resonator in the first vibratory mode with a first drive signal; a second drive circuit for simultaneously driving the resonator in the second vibratory mode with a second drive signal; wherein said first drive signal has a first frequency equal to a resonant frequency of said resonator in said first vibratory mode, and said second drive signal has the same frequency as the first drive signal, modulated in amplitude with a second frequency.

According to another embodiment disclosed herein, the Coriolis vibratory gyroscope further comprises a signal processor arranged for generating from the first and second sense signals: a first measurement signal of a rate of a rotation applied to the resonator in the resonator plane plus a measurement bias; and a second measurement signal of said measurement bias minus said rate of a rotation applied to the resonator in the resonator plane.

According to another embodiment disclosed herein, the signal processor is arranged for: generating a first to a fourth primary output signals by demodulating each of the first and second sense signals at said first frequency respectively in and out of phase with a reference phase; wherein said first measurement signal is based on the third primary output signal, calculated by demodulating the second sense signal in phase at said first frequency; and said second measurement signal is calculated by demodulating the first primary output signal in phase at said second frequency, said first primary output signal being calculated by demodulating the first sense signal in phase at said first frequency.

According to another embodiment disclosed herein, the signal processor is arranged for: generating a first to an eighth secondary output signals by demodulating each of the first to fourth intermediate output signals at said second frequency in and out of phase with said reference phase; wherein said second measurement signal is based on the first secondary output signal.

According to another embodiment disclosed herein, the Coriolis vibratory gyroscope is arranged for using, in an automatic gain control loop of said first drive circuit, the first primary output signal calculated by demodulating the first sense signal in phase at said first frequency.

According to another embodiment disclosed herein, the Coriolis vibratory gyroscope is arranged for using, in an PLL control loop of said first and second drive circuits, the second primary output signal calculated by demodulating the first sense signal out of phase at said first frequency.

According to another embodiment disclosed herein, the Coriolis vibratory gyroscope is arranged for using, in a force to rebalance control loop of said first and second drive circuits, the third primary output signal calculated by demodulating the second sense signal in phase at said first frequency.

According to another embodiment disclosed herein, the Coriolis vibratory gyroscope is arranged for using, in a closed loop quadrature control loop of first and second drive circuits, the fourth primary output signal calculated by demodulating the second sense signal out of phase at said first frequency.

According to another embodiment disclosed herein, the Coriolis vibratory gyroscope is arranged for using, in an amplitude control feedback loop that maintains a constant modulation amplitude at said second frequency, the fifth secondary output signal calculated by demodulating the third primary output signal in phase at said second frequency.

According to another embodiment disclosed herein, the major axis of said first n=2 vibratory mode is rotated by 45 degrees with respect to the major axis of said second n=2 vibratory mode.

According to another embodiment disclosed herein, the first and second sensing circuits respectively comprise a first sensing electrode and a second sensing electrode arranged at a first distance of a periphery of said resonator, and said first and second drive circuits respectively comprise a first drive electrode and a second drive electrode arranged at a second distance of said periphery of said resonator According to another embodiment disclosed herein, the resonator is rotationally symmetric; the first drive electrode is aligned with the major axis of the first n=2 mode; the second drive electrode is aligned with the major axis of the second n=2 mode; the first sensing electrode is aligned with the major axis of the first n=2 mode and diametrically opposed to the first drive electrode; and the second sensing electrode is aligned with the major axis of the second n=2 mode and diametrically opposed to the second drive electrode.

According to another embodiment disclosed herein, the second drive circuit is arranged for automatically changing the second frequency on a periodical basis.

According to another embodiment disclosed herein, the second drive circuit is arranged for automatically changing the second frequency in response to a detection by the signal processor that the rate of rotation has the second frequency.

According to another embodiment disclosed herein, the first and second drive circuit are arranged to operate the gyroscope in an open loop configuration.

According to another embodiment disclosed herein, the first and second drive circuit are arranged to operate the gyroscope in a closed loop configuration.

According to another embodiment disclosed herein, the first and second drive circuit are arranged to operate the gyroscope in a whole angle configuration.

Another embodiment disclosed herein relates to a method of driving a Coriolis vibratory gyroscope having: a resonator with at least a first and a second n=2 vibratory modes of same resonance frequency in a resonator plane; first and second sensing circuits for generating first and second sense signals in response to a motion of the resonator along a major axis of the first and second vibratory modes; a first drive circuit for driving the resonator in the first vibratory mode with a first drive signal; and a second drive circuit for simultaneously driving the resonator in the second vibratory mode with a second drive signal; the method comprising providing said first signal has a first frequency equal to a resonant frequency of said resonator in said first vibratory mode, and providing said second signal having the same frequency as said first signal, modulated in amplitude with a second frequency.

According to another embodiment disclosed herein, the method further comprises generating from the first and second sense signals: a first measurement signal of a rate of a rotation applied to the resonator in the resonator plane plus a measurement bias; and a second measurement signal of said measurement bias minus said rate of a rotation applied to the resonator in the resonator plane.

According to another embodiment disclosed herein, the method comprises generating a first to a fourth primary output signals by demodulating each of the first and second sense signals at said first frequency respectively in and out of phase with a reference phase; wherein said first measurement signal is based on the third primary output signal, calculated by demodulating the second sense signal in phase at said first frequency; and said second measurement signal is calculated by demodulating the first primary output signal in phase at said second frequency, said first primary output signal being calculated by demodulating the first sense signal in phase at said first frequency.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 8 illustrates a method according to embodiments of this presentation to control a known CVG such as the one illustrated in FIG. 1

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
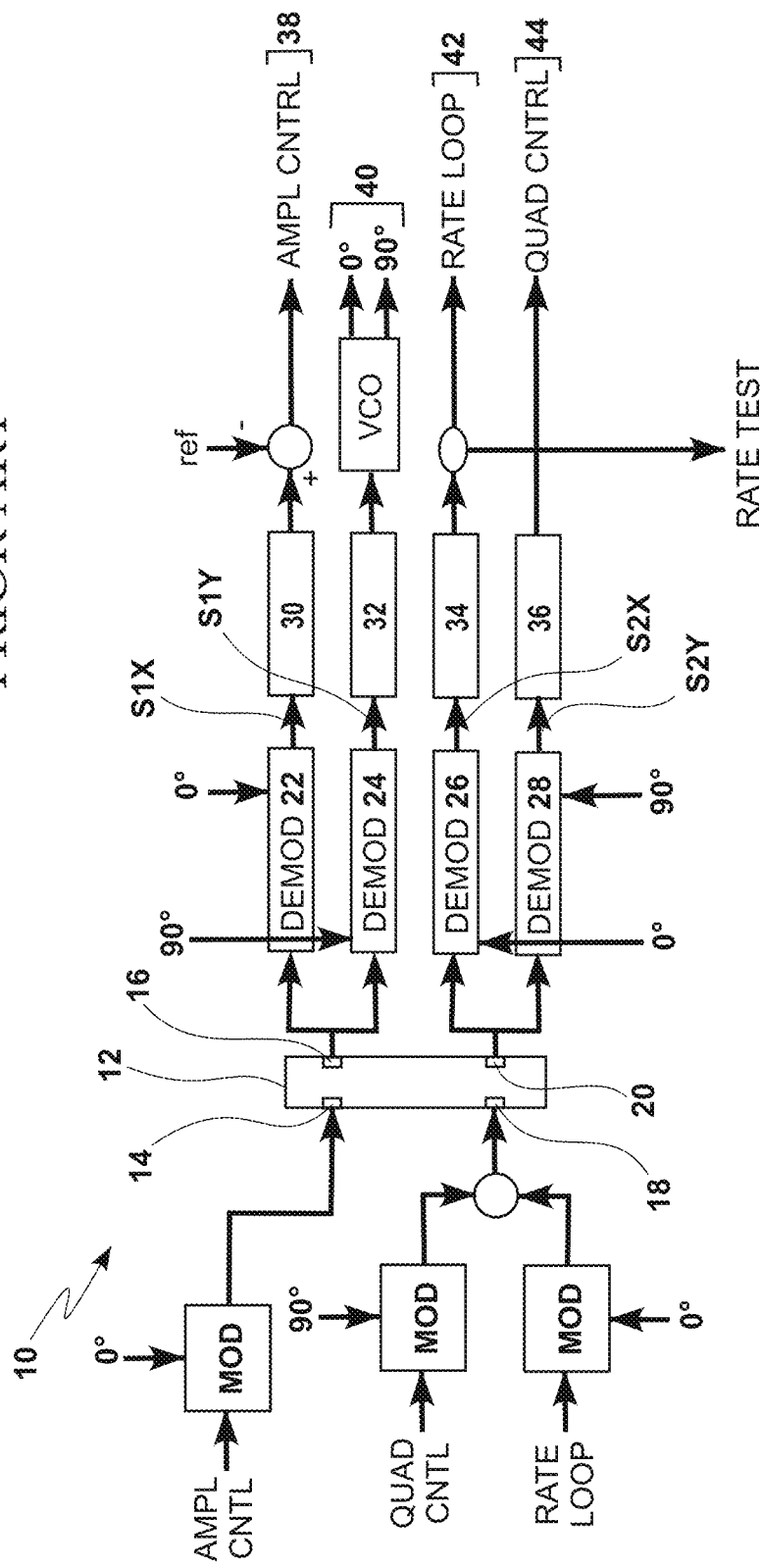
FIG. 1 illustrates a known CVG configured for a "force-to-rebalance" operation.

FIG. 1 illustrates schematically a Coriolis vibratory gyroscope (CVG) 10 that can be used in embodiments of this presentation. CVG 10 comprises a resonant structure (resonator) 12 that exhibits a degeneracy in its modal structure and comprises at least two modes (mode 1 and mode 2) at the same energy. Preferably, the two modes are of the second order or above, and the Coriolis force couples energy from one mode to another mode when a rotation rate is applied to resonator 12. According to embodiments of this presentation, the resonator can be an axisymmetric resonator and can comprise at least a first drive electrode 14 to drive oscillation of resonator 12 in the first mode, a first sense electrode 16 to sense a motion of resonator 12 along the first mode, a second drive electrode 18 to drive oscillation of resonator 12 in the second mode and a second sense electrode 20 to sense a motion of resonator 12 along the second mode. Resonator 12 can comprise a plane resonator having a periphery, for example having a generally circular shape, wherein first sensing electrode 16 and second sensing electrode 20 are arranged at a first distance of said periphery, and wherein first drive electrode 14 and second drive electrode 18 are arranged at a second distance of said periphery of said resonator. For example, first drive electrode 14 can be aligned with a major axis of the first mode, second drive electrode 18 can be aligned with the major axis of the second mode, first sensing electrode 16 can be aligned with the major axis of the first n=2 mode, and arranged diametrically opposed to first drive electrode 14; and second sensing electrode 20 can be aligned with the major axis of the second n=2 mode and arranged diametrically opposed to second drive electrode 18. First and second sense signals are generated at the first and second sense electrodes 16 and 20.

In a known operation of CVG 10, often called "force-to-rebalance" operation, mode 1 is driven to a fixed amplitude at a resonance frequency of mode 1, and mode 2 has no energy coupled into it unless there is a rotation rate applied. When a rotation rate is applied to resonator 12 and energy is coupled into mode 2, the CVG is arranged to apply a force to mode 2 to null the energy; and the amount of force that is applied is proportional to the input rotation rate. Four primary output signals are generated and monitored to maintain such full closed loop operation: A first primary output signal (S1X in FIG. 1) is an in-phase demodulation (using a demodulator 22) of the first sense signal at the resonance frequency; a second primary output signal (S1Y in FIG. 1) is an out-of-phase demodulation (using a demodulator 24) of the first sense signal; a third primary output signal (S2X in FIG. 1) is an in-phase demodulation (using a demodulator 26) of the second sense signal at the resonance frequency; a fourth primary output signal (S2Y in FIG. 1) is an out-of-phase demodulation (using a demodulator 28) of the second sense signal;

The four primary output signals can be low pass filtered (using low pass filters 30, 32, 34, 36) and put into feedback control loops for amplitude gain control (AGC, 38), phased lock loop (PLL, 40), force to rebalance (FTR, 42) and closed loop quadrature (CLQ, 44). PI gain amplifiers may be used in each of the control loops, but are not illustrated in FIG. 1. Details about a CVG 10 such as illustrated in FIG. 1 can for example be found in "Coriolis Vibratory Gyros", by D. D. Lynch, Symposium Gyro Technology 1998 Stuttgart, Germany, which is hereby incorporated by reference in its entirety.

It has been noted, based on the 1998 Lynch reference above, that, considering each mode of resonator 12 as a simple harmonic oscillator, the first and second sense signals x, y follow the following equations:

$$\ddot{x} + \left[\frac{2}{\tau} + \Delta\left(\frac{1}{\tau}\right)\cos 2\theta_\tau\right]\dot{x} + [\omega^2 - k'^2\Omega^2]x = \left[2k\Omega - \Delta\left(\frac{1}{\tau}\right)\sin 2\theta_\tau\right]\dot{y} + \ldots$$

$$\ddot{y} + \left[\frac{2}{\tau} - \Delta\left(\frac{1}{\tau}\right)\cos 2\theta_\tau\right]\dot{y} + [\omega^2 - k'^2\Omega^2]y = \left[-2k\Omega - \Delta\left(\frac{1}{\tau}\right)\sin 2\theta_\tau\right]\dot{x} + \ldots$$

where the $2K\Omega$ term represents the Coriolis force to measure the rotation rate of the resonator, and the $\Delta(1/\tau)\sin 2\theta\tau$ term represents the measurement bias of the resonator.

To separate the rotation rate from the measurement bias, some prior art self-calibration methods rotate or flip the mode position, where initially mode 1 is fully excited and mode 2 is not being driven, and at a later time mode 2 is being driven and mode 1 is not driven. However, typical timescales for the mode rotation are minutes for existing algorithms, and because the bias can only be estimated at this timescale, faster bias changes are not captured.

A further downside of the above known method is that an assumption is made that the gyro bias does not depend on mode amplitude, and when energy is swapped between mode 1 and mode 2, the bias has not changed. However, depending on the quality of the resonator this assumption may not be true as e.g. the mode pinning angle can change by many degrees when the mode amplitude is pumped up, leading to bias changes on the order of 1000 deg/hr or more. The inventors therefore looked for a way of measuring bias where the act of measuring energy coupling in both directions does not shift the bias appreciably.

According to embodiments of this presentation, a fixed frequency dither is added to drive mode 2, which effectively allow a rotation rate to couple an energy from mode 2 to mode 1, that can be discriminated from the energy coupled from mode 1 to mode 2 because it is being coupled at the dither frequency. If the dither is fast enough, the bias will settle into a quasi-static state and can be estimated. Embodiments of this presentation are applicable for example if the bias shifts because of heat dissipation in the device, as one can use the thermal relaxation time to effectively average out the heating effects of the dither, similar to the way a pulse width modulation controller can be used for thermal control when the pulse frequency is fast enough. According to embodiments of this presentation, a "fast enough" dither is a dither that is fast in relation to the thermal time constant of the resonator so that the temperature profile of the resonator is in a quasi-static state that the bias can be estimated from. If the temperature distribution in the resonator changes, e.g. due to a mode position change, that will also create a bias shift. For example, the minimum dither frequency can be in the 0.1 Hz-1 Hz range but it can also be up to 10 Hz.

According to embodiments of this presentation, the dither is added by driving mode 2 with a signal having the same frequency as mode 1, but modulated in amplitude at the dither frequency. According to embodiments of this presentation, an exemplary dither frequency can be of 1 Hz.

Figure 2:
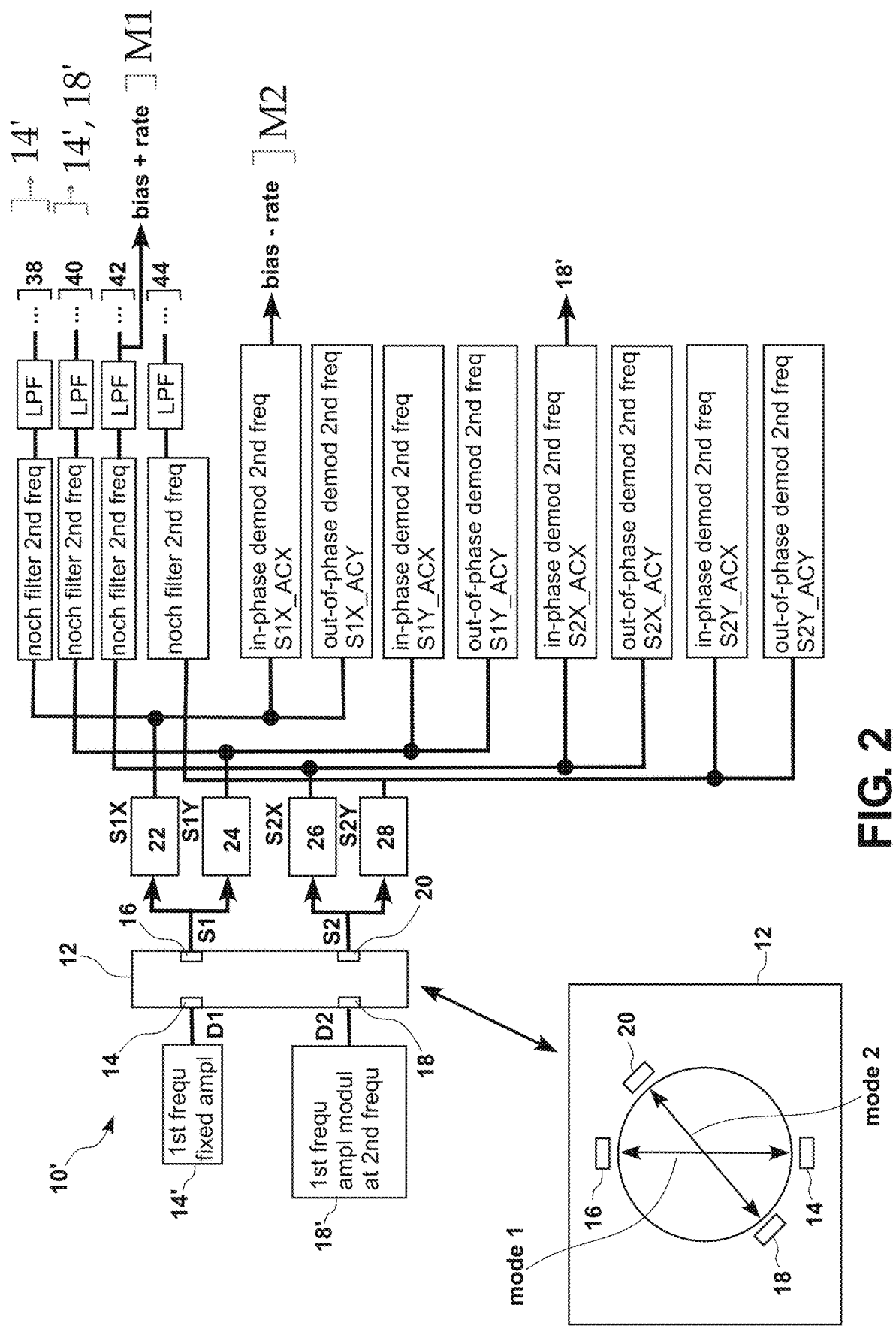
FIG. 2 illustrates a CVG according to embodiments of this presentation.

FIG. 2 illustrates a CVG 10' according to embodiments of this presentation, that is similar to the CVG 10 of FIG. 1, except that the second mode 2 is driven at the same frequency as mode 1 with an amplitude modulation at the dither frequency, and that at least some of the primary signals are demodulated at the dither frequency, as detailed hereafter.

According to embodiments of this presentation, CVG 10' comprises resonator 12, wherein resonator 12 is preferably a plane resonator, and has at least a first and a second n=2 vibratory modes of same resonance frequency in a resonator plane. Resonator 12 can comprise an axisymmetric resonator, for example a resonating disk as illustrated in FIG. 2. Resonator 12 can for example be such that the major axis of its first n=2 vibratory mode is rotated by 90 degrees with respect to the major axis of its second n=2 vibratory mode, as also illustrated in FIG. 2. CVG 10' further comprises first (16) and second (20) sensing circuits for generating first (S1) and second (S2) sense signals in response to a motion of resonator 12 respectively along the first and second major axis of the first (mode 1) and second (mode 2) vibratory modes. CVG 10' further comprises a first drive circuit (14, 14') for driving resonator 12 in the first vibratory mode (mode 1) with a first drive signal D1; and a second drive circuit (18, 18') for simultaneously driving resonator 12 in the second vibratory mode (mode 2) with a second drive signal D2. According to embodiments of this presentation, the first drive signal D1 has a first frequency equal to a resonant frequency of resonator 12 in the first vibratory mode (mode 1), and the second drive signal D2 has the same frequency as the first drive signal D1, modulated in amplitude with a dither frequency.

According to embodiments of this presentation, CVG 10' further comprises a signal processor (22, 24, 26, 28) arranged for generating from the first and second sense signals (S1, S2): a first measurement signal M1 that represents a rate of a rotation applied to the resonator in the resonator plane plus a measurement bias; and a second measurement signal M2 that represents said measurement bias minus the rate of a rotation applied to the resonator in the resonator plane.

According to embodiments of this presentation, the signal processor (22, 24, 26, 28) is arranged for generating a first primary output signal S1X by demodulating in phase with a reference phase the first sense signal S1 at the first frequency; a second primary output signal S1Y by demodulating out-of-phase (by 90°) with the reference phase the first sense signal S1 at the first frequency, a third primary output signal S2X by demodulating in phase with the reference phase the second sense signal S2 at the first frequency and a fourth primary output signal S2Y by demodulating out-of-phase (by 90°) with the reference phase the second sense signal S2 at the first frequency.

According to embodiments of this presentation, the first measurement signal M1 is based on the third primary output signal S2X and the second measurement signal M2 is calculated by demodulating the first primary output signal S1X in phase at the dither frequency. A sum of M1 and M2, eventually weighed by appropriate factors, allows calculating the bias, whereas the subtraction of M1 and M2, eventually weighed by appropriate factors, allows calculating the rotation rate. Notch filters and low pass filters can be used as illustrated in FIG. 2 to clean the primary output signals before they are used in the loops.

According to embodiments of this presentation, the signal processor of CVG 10' is arranged for generating eight secondary output signals S1X_ACX, S1X_ACY, S1Y_ACX, S1Y_ACY, S2X_ACX, S2X_ACY, S2Y_ACX, and S2Y_ACY, by demodulating each of the first to fourth intermediate output signals S1X, S1Y, S2X, S2Y at the dither frequency, in and out of phase with said reference phase; wherein said second measurement signal is based on the first secondary output signal.

According to embodiments of this presentation, the first primary output signal S1X is used in an automatic gain control loop of said first (14', 14) drive circuit, consistently with the details given in FIG. 1. According to embodiments of this presentation, the second primary output signal S1Y is used in an PLL control loop of said first and second drive circuits. According to embodiments of this presentation, the second mode is driven at the same frequency as the first mode as determined by the PLL. It is driven in phase with the first mode but at the appropriate location around the circumference of the device, so the actuation of mode 2 is orthogonal to mode 1.

According to embodiments of this presentation, the third primary output signal, S2X, is used in a force to rebalance control loop of the first and second drive circuits if CVG 10' is operated in a closed loop/force to rebalance mode.

According to embodiments of this presentation, the fourth primary output signal, S2Y, is used in a closed loop quadrature control loop of the first and second drive circuits.

According to embodiments of this presentation, the fifth secondary output, signal S2X_ACX, calculated by demodulating the second primary output signal S2X in phase at said second frequency, is used in an amplitude control feedback loop to maintain a constant modulation amplitude of said mode 2 at said second frequency. According to embodiments of this presentation, any phase offsets in the dither demodulators will show up in S1X_ACY and S2X_ACY and can be nulled by a phase adjustment in the reference oscillator.

A CVG or sensor according to embodiments of this presentation is agnostic to the source of the bias drift (including temperature changes, damping instability, vibration, external stress), and therefore does not require a-priori knowledge of the source of the bias instability, nor does it require calibration look-up tables which can be of limited accuracy and change over time. Depending on the properties of the CVG (including quality factor and resonant frequency) the estimation of bias can be accomplished very quickly (for example faster than 1 Hz) and used to compensate for the drift in the bias at longer measurement times, which would typically limit the device performance. It also means that a CVG according to embodiments of this presentation can be implemented using CVGs which otherwise would have relatively poor performance (e.g. poorly made CVGs such as illustrated in FIG. 1, which would intrinsically begin to drift quickly and would otherwise be unusable for many applications) to drastically improve performance. A CVG according to this presentation also augment the performance of higher-end CVGs. Advantageously, a CVG according to this presentation also makes no assumption about the CVG operating environment (i.e. does not require a separate calibration period or calibration mode with reduced or no functionality prior to use).

A potential drawback can appear with a CVG according to this presentation if the input rotation rate changes at the dither frequency. According to embodiments of this presentation, the filtering topology can therefore be arranged such that any rate at the dither frequency would be notch filtered away and would not register in a Force To Rebalance (FTR)

loop. A problem however is that since the notch filter has a very long delay at the notch frequency, when closing the FTR loop said loop would quickly become unstable with oscillations at the dither frequency. A solution to this problem is to actively add a signal to S2X (the input to the FTR loop) at the dither frequency that cancels the dither, effectively accounting for the energy input into the device to do the self-calibration. However, since the compensation signal will never perfectly cancel the dither in practice, there will be with the above solution an increased rate noise at the dither frequency, depending on how well the cancellation can be done. This essentially trades off long term stability for a higher noise floor at the dither frequency. In practice, either due to capacitive gap nonlinearity or harmonic distortion, there are also tones at harmonic frequencies of the dither that need to be compensated for.

An alternative solution comprises changing periodically the dither frequency, to reduce the chances of having the input rotation rate change at the dither frequency.

An alternative solution comprises providing the CVG with a circuit for comparing the frequency of the measured rate to the dither frequency, and changing automatically the dither frequency in response to a detection that the rate of rotation has the dither frequency, or is getting closer to the dither frequency than a predetermined threshold.

It should be noted that a CVG according to this presentation can be operated in an open loop configuration, as well as in a closed loop configuration, as well as in a whole angle configuration.

Figure 3:
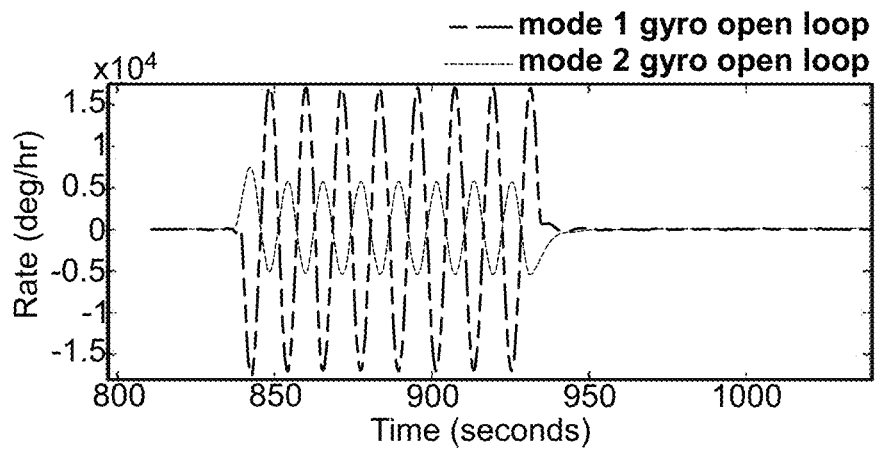
FIG. 3 illustrates the open loop outputs of both modes of a CVG according to embodiments of this presentation.
Figure 4:
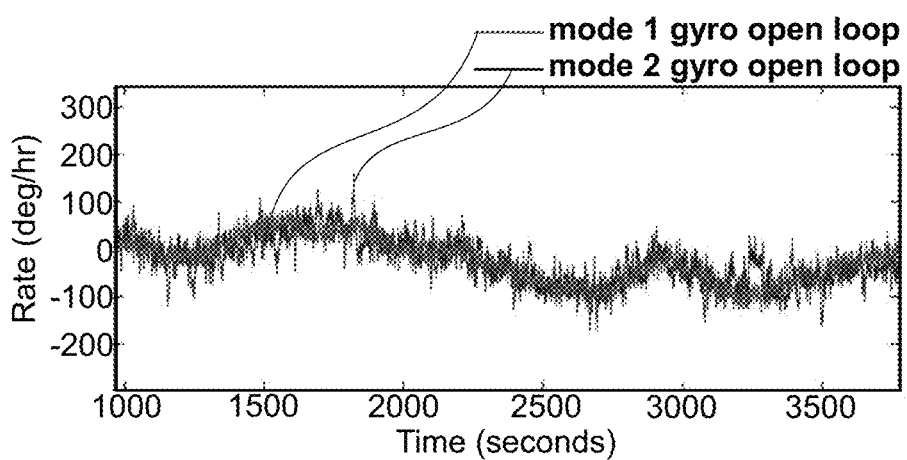
FIG. 4 illustrates the drift in time of the open loop outputs of both modes of a CVG according to embodiments of this presentation when the bias drifts in time.

FIG. 3 illustrates a varying rate measured as a function of time in an open loop configuration for the mode 1 and mode 2 loops of a CVG according to embodiments of this presentation. As outlined above, the rates measured for the mode 1 and mode 2 loops are of opposite signs. FIG. 3 also illustrates that a pondering factor may have to be used to obtain consistent absolute value measurements of the rate on mode 1 and mode 2, depending for example on the geometry of the resonator. It is noted that the different scale factor for the two signals in FIG. 3 is a result of how close the dither frequency is to the ring down time of the resonator. Faster dithers will have a reduced scale factor which will be accounted for in the bias calculation FIG. 4 illustrates the common drift with time of the rates shown in FIG. 3 when the bias varies rapidly, when no rate is applied.

Figure 5:
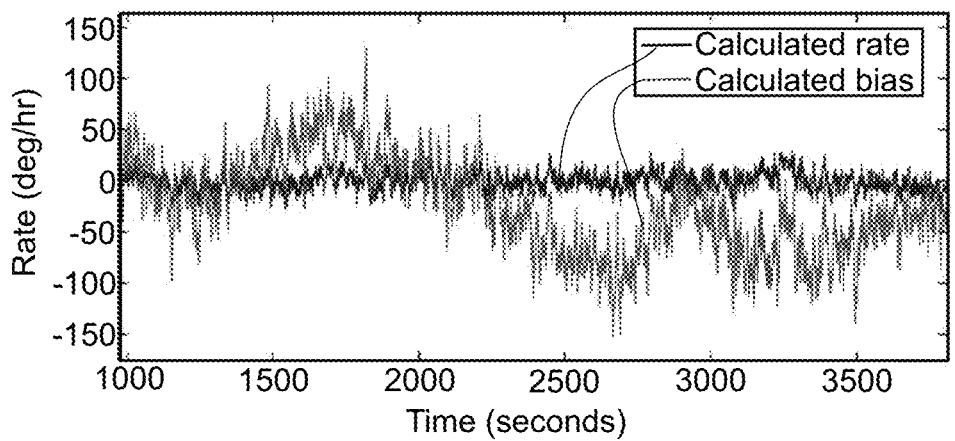
FIG. 5 illustrates the calculated rate with the bias removed, and bias drift isolated from the rate of a CVG according to embodiments of this presentation.

FIG. 5 illustrates the rate and the bias calculated/measured using a CVG according to embodiments of this presentation, when the bias varies rapidly but not the rate. It can be seen that, advantageously, the rate is accurately measured as not varying while the bias varies.

Figure 6:
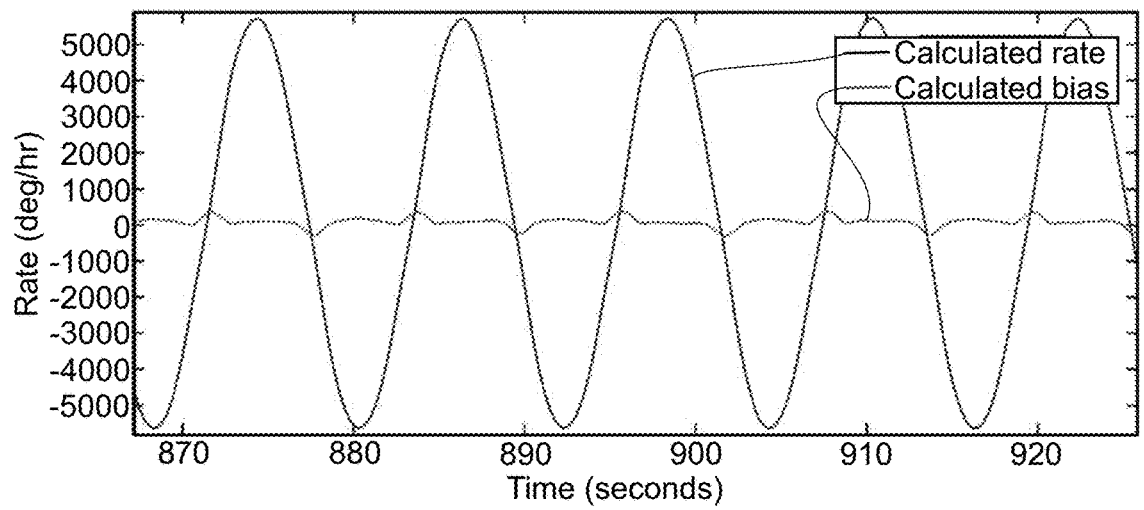
FIG. 6 illustrates that in a CVG according to embodiments of this presentation, when an input rate is applied it is reflected predominantly in the calculated rate signal.

FIG. 6 illustrates the rate and the bias calculated/measured using a CVG according to embodiments of this presentation, when the bias does not vary but the rate varies rapidly. It can be seen that, advantageously, the bias is accurately measured as not varying while the rate varies.

Figure 7:
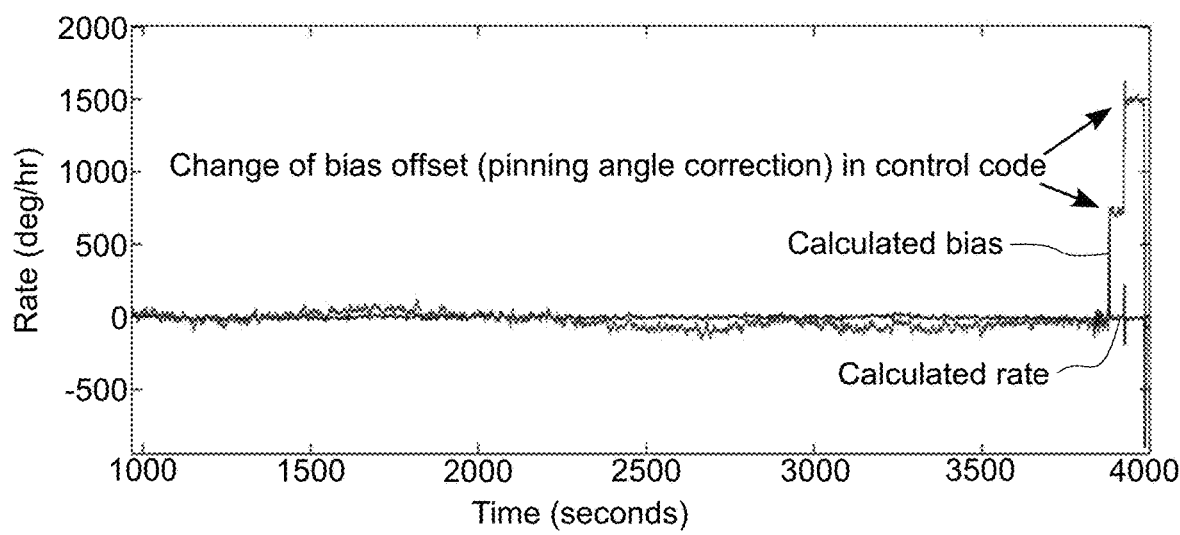
FIG. 7 illustrates that in a CVG according to embodiments of this presentation, a zero bias offset of the measurement can be changed and be reflected in the bias estimate but not in the rate estimate.

FIG. 7 illustrates the rate and the bias calculated/measured using a CVG according to embodiments of this presentation, when the bias is changed arbitrarily by changing a bias offset. It can be seen that, advantageously, the rate is accurately measured as not varying while the bias varies.

FIG. 8 illustrates a method 50 according to embodiments of this presentation to control a known CVG such as the one illustrated in FIG. 1, the CVG having a resonator with at least a first and a second n=2 vibratory modes of same resonance frequency in a resonator plane; first and second sensing circuits for generating first and second sense signals in response to a motion of the resonator along a major axis of the first and second vibratory modes; a first drive circuit for driving the resonator in the first vibratory mode with a first drive signal; and a second drive circuit for simultaneously driving the resonator in the second vibratory mode with a second drive signal.

According to an embodiment of this presentation, method 50 comprises: providing 52 said first signal has a first frequency equal to a resonant frequency of said resonator in said first vibratory mode, and providing 54 said second signal having the same frequency as said first signal, modulated in amplitude with a second, dither, frequency.

According to an embodiment of this presentation, method 50 further comprises generating 56 from the first and second sense signals a first measurement signal of a rate of a rotation applied to the resonator in the resonator plane plus a measurement bias; and generating 58 from the first and second sense signals a second measurement signal of said measurement bias minus said rate of a rotation applied to the resonator in the resonator plane.

According to an embodiment of this presentation, method 50 comprises generating 56 the first measurement signal by demodulating 60 the second sense signal in phase at said first frequency; and generating 58 the second measurement signal by demodulating 64 the first primary output signal in phase at said second frequency, said first primary output signal being calculated by demodulating 62 the first sense signal in phase at said first frequency.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of. . . ."

What is claimed is:

1. A Coriolis vibratory gyroscope having:
   a resonator with at least a first and a second n=2 vibratory modes of same resonance frequency in a resonator plane;
   first and second sensing circuits for generating first and second sense signals in response to a motion of the resonator along a major axis of the first and second vibratory modes;
   a first drive circuit for driving the resonator in the first vibratory mode with a first drive signal;
   a second drive circuit for simultaneously driving the resonator in the second vibratory mode with a second drive signal;
   wherein said first drive signal has a first frequency equal to a resonant frequency of said resonator in said first vibratory mode, and said second drive signal has the same frequency as the first drive signal, modulated in amplitude with a second frequency; and
   wherein the first and second drive circuit are arranged to operate the gyroscope in one of: an open loop configuration; a closed loop configuration; and a whole angle configuration.

2. The Coriolis vibratory gyroscope of claim 1, further comprising a signal processor arranged for generating from the first and second sense signals:
   a first measurement signal of a rate of a rotation applied to the resonator in the resonator plane plus a measurement bias; and
   a second measurement signal of said measurement bias minus said rate of a rotation applied to the resonator in the resonator plane.

3. The Coriolis vibratory gyroscope of claim 2, wherein the signal processor is arranged for:
   generating a first to a fourth primary output signals by demodulating each of the first and second sense signals at said first frequency respectively in and out of phase with a reference phase; wherein
   said first measurement signal is based on the third primary output signal, calculated by demodulating the second sense signal in phase at said first frequency; and
   said second measurement signal is calculated by demodulating the first primary output signal in phase at said second frequency, said first primary output signal being calculated by demodulating the first sense signal in phase at said first frequency.

4. The Coriolis vibratory gyroscope of claim 3, wherein the signal processor is arranged for:
   generating a first to an eighth secondary output signals by demodulating each of the first to fourth intermediate output signals at said second frequency in and out of phase with said reference phase; wherein said second measurement signal is based on the first secondary output signal.

5. The Coriolis vibratory gyroscope of claim 4 arranged for using, in an amplitude control feedback loop that maintains a constant modulation amplitude at said second frequency, the fifth secondary output signal calculated by demodulating the third primary output signal in phase at said second frequency.

6. The Coriolis vibratory gyroscope of claim 3 arranged for using, in an automatic gain control loop of said first drive circuit, the first primary output signal calculated by demodulating the first sense signal in phase at said first frequency.

7. The Coriolis vibratory gyroscope of claim 3 arranged for using, in an PLL control loop of said first and second drive circuits, the second primary output signal calculated by demodulating the first sense signal out of phase at said first frequency.

8. The Coriolis vibratory gyroscope of claim 3, arranged for using, in a force to rebalance control loop of said first and second drive circuits, the third primary output signal calculated by demodulating the second sense signal in phase at said first frequency.

9. The Coriolis vibratory gyroscope of claim 3 arranged for using, in a closed loop quadrature control loop of first and second drive circuits, the fourth primary output signal calculated by demodulating the second sense signal out of phase at said first frequency.

10. The Coriolis vibratory gyroscope of claim 2, wherein the second drive circuit is arranged for automatically changing the second frequency on a periodical basis.

11. The Coriolis vibratory gyroscope of claim 2, wherein the second drive circuit is arranged for automatically changing the second frequency in response to a detection by the signal processor that the rate of rotation has the second frequency.

12. The Coriolis vibratory gyroscope of claim 1, wherein said first and second sensing circuits respectively comprise a first sensing electrode and a second sensing electrode arranged at a first distance of a periphery of said resonator, and wherein said first and second drive circuits respectively comprise a first drive electrode and a second drive electrode arranged at a second distance of said periphery of said resonator.

13. The Coriolis vibratory gyroscope of claim 12, wherein the resonator is rotationally symmetric; the first drive electrode is aligned with the major axis of the first n=2 mode; the second drive electrode is aligned with the major axis of the second n=2 mode; the first sensing electrode is aligned with the major axis of the first n=2 mode and diametrically opposed to the first drive electrode; and the second sensing electrode is aligned with the major axis of the second n=2 mode and diametrically opposed to the second drive electrode.

14. A Coriolis vibratory gyroscope having:
   a resonator with at least a first and a second n=2 vibratory modes of same resonance frequency in a resonator plane;
   first and second sensing circuits for generating first and second sense signals in response to a motion of the resonator along a major axis of the first and second vibratory modes;
   a first drive circuit for driving the resonator in the first vibratory mode with a first drive signal;
   a second drive circuit for simultaneously driving the resonator in the second vibratory mode with a second drive signal;
   wherein said first drive signal has a first frequency equal to a resonant frequency of said resonator in said first vibratory mode, and said second drive signal has the same frequency as the first drive signal, modulated in amplitude with a second frequency; wherein the major axis of said first n=2 vibratory mode is rotated by 45 degrees with respect to the major axis of said second n=2 vibratory mode.

15. A method of driving a Coriolis vibratory gyroscope having:
   a resonator with at least a first and a second n=2 vibratory modes of same resonance frequency in a resonator plane;

first and second sensing circuits for generating first and second sense signals in response to a motion of the resonator along a major axis of the first and second vibratory modes;

a first drive circuit for driving the resonator in the first vibratory mode with a first drive signal;

a second drive circuit for simultaneously driving the resonator in the second vibratory mode with a second drive signal;

the method comprising providing said first signal has a first frequency equal to a resonant frequency of said resonator in said first vibratory mode, and providing said second signal having the same frequency as said first signal, modulated in amplitude with a second frequency; the method further comprising using the first and second drive circuit to operate the gyroscope in one of: an open loop configuration; a closed loop configuration; and a whole angle configuration.

16. The method of claim 15, further comprising generating from the first and second sense signals:

a first measurement signal of a rate of a rotation applied to the resonator in the resonator plane plus a measurement bias; and a second measurement signal of said measurement bias minus said rate of a rotation applied to the resonator in the resonator plane.

17. The method of claim 16, comprising generating a first to a fourth primary output signals by demodulating each of the first and second sense signals at said first frequency respectively in and out of phase with a reference phase; wherein said first measurement signal is based on the third primary output signal, calculated by demodulating the second sense signal in phase at said first frequency; and said second measurement signal is calculated by demodulating the first primary output signal in phase at said second frequency, said first primary output signal being calculated by demodulating the first sense signal in phase at said first frequency.

* * * * *